United States Patent [19]
Von Kohorn

[11] Patent Number: 5,368,129
[45] Date of Patent: Nov. 29, 1994

[54] RETAIL FACILITY WITH COUPONING

[76] Inventor: Henry Von Kohorn, 945 Treasure La., Vero Beach, Fla. 32963

[21] Appl. No.: 919,025

[22] Filed: Jul. 23, 1992

[51] Int. Cl.⁵ ............................................. G06F 15/21
[52] U.S. Cl. ..................... 186/52; 235/383; 364/405
[58] Field of Search ................ 186/52, 61; 364/405, 364/410, 412; 235/383, 385; 273/138 A

[56] References Cited

U.S. PATENT DOCUMENTS

| | | | |
|---|---|---|---|
| 4,339,798 | 7/1982 | Hedges et al. | 364/412 |
| 4,494,197 | 1/1985 | Troy et al. | 364/412 |
| 4,689,742 | 8/1987 | Troy et al. | 364/412 |
| 4,723,212 | 2/1988 | Mindrum et al. | 364/401 |
| 4,821,186 | 4/1989 | Munakata et al. | 364/405 |
| 4,896,791 | 1/1990 | Smith | 221/7 |
| 4,908,761 | 3/1990 | Tai | 364/401 |
| 4,910,672 | 3/1990 | Off et al. | 364/405 |
| 4,949,256 | 8/1990 | Humble | 364/401 |
| 4,972,504 | 11/1990 | Daniel, Jr. et al. | 455/2 |
| 4,993,714 | 2/1991 | Golightly | 273/138 A |
| 5,057,915 | 10/1991 | Von Kohorn | 358/84 |
| 5,091,634 | 2/1992 | Finch et al. | 235/375 |
| 5,111,927 | 5/1992 | Schulze, Jr. | 194/209 |
| 5,128,520 | 7/1992 | Rando et al. | 235/375 |
| 5,128,752 | 7/1992 | Von Kohorn | 358/84 |
| 5,176,224 | 1/1993 | Spector | 186/52 |
| 5,208,445 | 5/1993 | Nahar et al. | 235/383 X |

Primary Examiner—F. J. Bartuska
Attorney, Agent, or Firm—Perman & Green

[57] ABSTRACT

A retail outlet with billing facilities has an integrated couponing system, including a printer to record on shoppers' coupons pay-off values randomly determined by the couponing system within predetermined parameters. Discount and other pay-off values are recorded on coupons associated with product categories. Value consideration is given a shopper by deducting the coupon value from the shopper's bill before shopper takes possession of the merchandise. Random prizes add excitement to the shopping experience.

43 Claims, 3 Drawing Sheets

1

RETAIL FACILITY WITH COUPONING

BACKGROUND OF THE INVENTION

1. Field Of The Invention

The present invention relates to merchandising and, more particularly, to coupons used to promote merchandising.

2. Prior Art

It is common practice on the part of manufacturers and retailers to make coupons available to the public in order to induce the purchase of merchandise promoted by such sellers. Normally, such coupons are distributed through the mail, free-standing inserts, and the print media. Such coupons generally carry discounts on the promoted products or services. More recently, in-store promotions have included in-store couponing, which permits shoppers to select discount coupons on merchandise intended for purchase at such retail facility. U.S. Pat. No. 4,910,672 to Off et al. discloses a system for creating discount coupons in response to the purchase of products. U.S. Pat. No. 4,949,256 to Humble discloses a coupon validation network. U.S. Pat. Nos. 4,745,468; 4,876,592; 4,926,255; 5,057,915; and 5,034,807 to Von Kohorn disclose various dispensing units intended to be used with broadcast transmissions. The promotional efforts by many competing manufacturers and retailers tend to equalize and generally result in shoppers viewing all coupons and couponing systems alike, without any one seller generating special interest or excitement. In-store couponing is also perceived as a tedious chore by shoppers. It causes consumers with their shopping carts to compare coupons in supermarket aisles impeding movement through the store.

It is the object of the present invention to introduce a measure of fun and excitement into the couponing efforts by manufacturers, retailers and service providers.

It is another object of the invention to generate heightened interest on the part of shoppers by introducing an element of gaming and prize winning into the shopping process, thereby attracting shoppers to stores.

It is another object to stimulate shopper interest without interfering with the normal traffic flow in stores, such as supermarkets, nor with the common checkout counter procedures.

SUMMARY OF THE INVENTION

At a retail outlet, such as a supermarket, categorized products are displayed in normal fashion. Shoppers are given the opportunity to take coupons and such coupons can be available in shopping aisles or another location inside or outside a store. Coupons may be associated with a specific product or product category.

According to a preferred embodiment of the system and methods of the invention, a coupon validating apparatus is placed in a store, normally in close proximity to a checkout counter, and preferably in the checkout counter line, although it may be placed elsewhere inside or outside the store. The apparatus is designed so that a shopper who has a discount coupon applicable to a purchased product can place the coupon in or on the apparatus for validation and possibly winning a prize. The validating apparatus, which ordinarily is activated by a shopper, performs several functions. It randomly selects a value, such as a discount, to be carried by the shopper's coupon. Such random selection mechanism can be similar to the well known gaming devices used in "slot machines" sometimes known as "One-Armed Bandits". Ordinarily such random selection or determination devices include means for adjusting the values of dispensed coupons, as well as their frequency, i.e., the percentages of coupons of each denomination or value dispensed.

The system and methods of the invention greatly speed up the process of determining and implementing couponing strategies, the execution of which can be compressed to a time lapse of minutes. In addition, the pay-offs for individual product groups are entirely within the control of a store operator. As is described hereinafter, the pay-offs made possible by the present system are adjustable to a much greater degree than those of traditional casino slot machines.

For instance, a slot machine can be adjusted so as to reward 3% to 10% of the players with prizes, but according to the present invention a different pay-off range can be determined for each class of product. Larger prizes can be interspersed at different ratios for different products and the value of prizes is controlled at the discretion of the owner of the machine. Thus, while winners are randomly determined, the "pay-offs" or awards to individual winners are made within predetermined and adjustable parameters. Discount values, awards and other prizes can be announced through means such as a loudspeaker or displays on the apparatus in supermarket aisles or other retail locations, including checkout lines.

The awarding of discount, cash and sweepstake prizes to customers with coupons adds to the interest and involvement of shoppers standing in a checkout counter line. The cost-free opportunity to win a monetary prize attracts shoppers to stores.

BRIEF DESCRIPTION OF THE DRAWINGS

The foregoing aspects and other features of the invention are explained in the following description, taken in connection with the accompanying drawings, wherein.

DETAILED DESCRIPTION OF THE INVENTION

Figure 1:
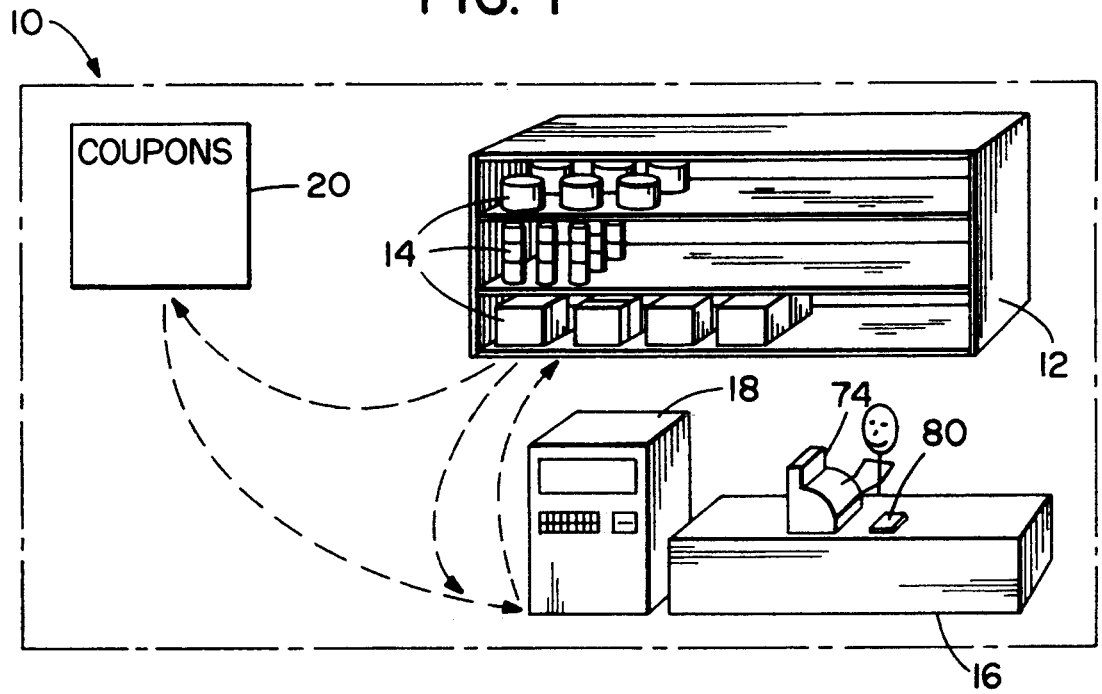
FIG. 1 is a diagrammatical view of a retail facility having a coupon validation apparatus and system having features of the present invention.

Referring to FIG. 1, there is shown a diagrammatical view of a retail facility 10. The retail facility 10 can be any suitable type of facility such as a supermarket, department store, wholesale outlet, etc. The facility 10 generally includes displays, shelves, or stands 12 of goods 14 available for purchase, a checkout counter 16, and a coupon validator 18. In the embodiment shown, the facility 10 also includes a coupon display/dispenser 20 located in the facility 10. However, it should be understood that the coupon display/dispenser 20 need not be provided or may be provided outside the facility 10. The coupon display/dispenser 20 can be any suitable type of passive coupon display rack or interactive coupon generating machine. Coupons dispensed to shoppers by coupon dispensers, such as kiosks inside or outside sales outlets, can be processed according to the method described. Shoppers can also bring coupons from newspapers, direct mail, etc. with them to the facility 10. The coupons generally identify a product, or group of products, and a fixed discount value intended to be deducted from the purchase price of the product.

It should be understood that, while the invention is described herein in terms of products sold at supermarkets, the invention is applicable to other types of goods or services sold at other facilities and that coupons may be replaced by tokens, certificates, printouts and the like.

Figure 3:
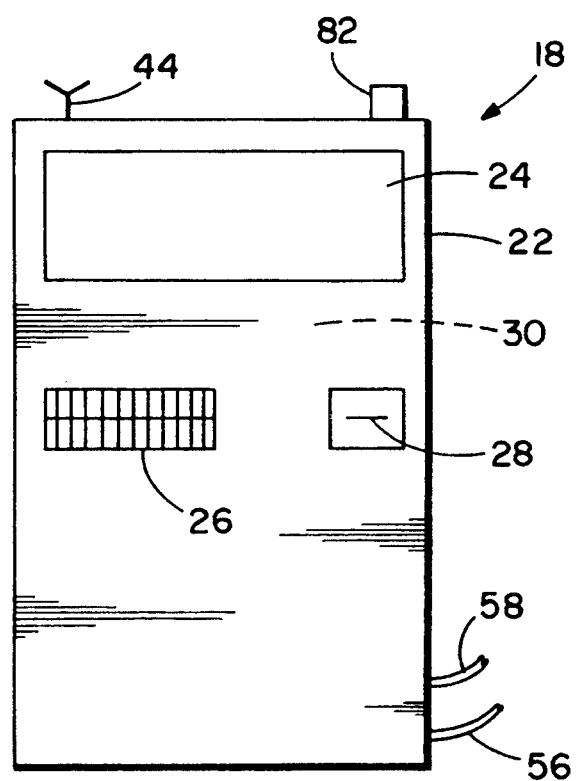
FIG. 3 is a plan front view of the coupon validation apparatus shown in FIG. 1.
Figure 2:
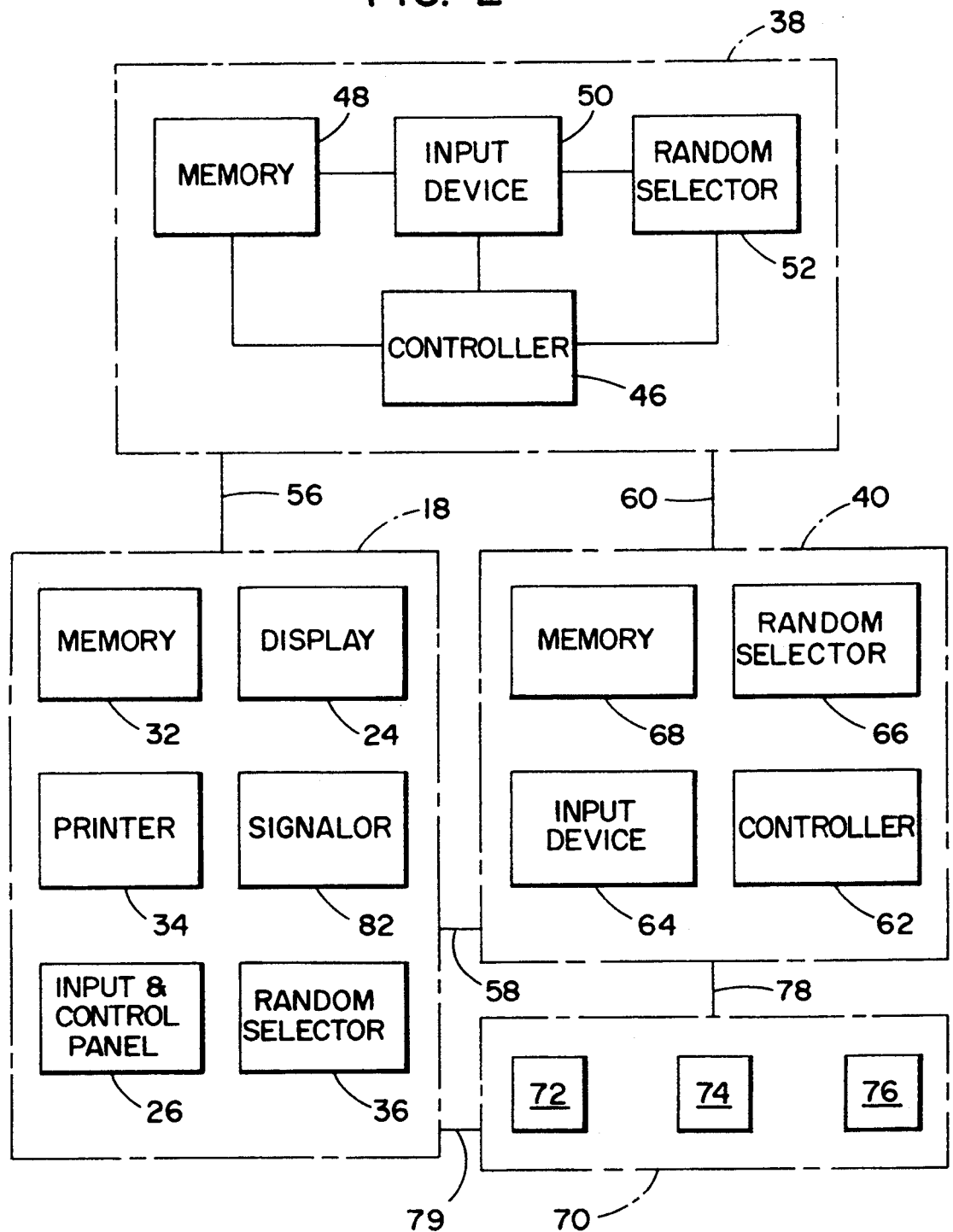
FIG. 2 is a schematic block diagram of the system of the present invention.

Referring also to FIGS. 2 and 3, the coupon validator or validating apparatus 18 generally comprises a housing 22, a display 24, an input/control panel 26, a coupon receiving slot 28, and internal electronics 30. The display 24 is preferably an electronic display such as a CRT or LCD. The display 24 is generally provided to inform users of certain information as further understood below. The internal electronics 30 generally includes a memory 32, a printer 34, and a random selector 36. The memory 32 can include a RAM, a ROM, a PROM, and/or a DRAM, or any suitable type of memory. The printer 34 is adapted to print information on a coupon inserted into the coupon receiving slot 28 by a user. The printer 34 can be a laser printer, a dot matrix printer, a thermal printer, etc. In an alternate embodiment, the printer 34 could be replaced by any suitable writing device, such as an electronic writing device adapted to magnetically record information on a magnetic strip on the coupon. The random selector 36 is preferably an electronic circuit adapted to generate random values of predetermined information contained in the memory 32. However, in an alternate embodiment, the random selector 36 may be mechanical.

The validator 18 is generally connected to a controller 38 at a central location and/or a local facility controller 40 by means of a communication cables 56 and 58 and/or by means of antenna 44. However, in an alternate embodiment, the validator 18 can be substantially self-contained. The central location controller 38 and the local facility controller 40 are generally connected to the validator 18 in order to input information into the memory 32 and adjust the characteristics of the random selector 36. In a substantially self-contained embodiment, suitable means can be provided to program or change the information in the memory 32 and/or the characteristics of the random selector 36, such as by means of an electronic floppy disk or tape and the validator 18 having a suitable disk or tape reading device.

The central location controller 38 includes a controller 46, a memory 48, an input device 50, and a random selector 52. It should be understood that the central location controller 38 need not be provided. In the system shown, the controller 38 is connected to validator 18 by a communications cable 56. Alternative communication means could include broadcast means at the controller 38 that can broadcast signals to the antenna 44 or, telephone lines could be used with the central location controller 38 and validator 18 each having a modem. The central location controller 38 is preferably connected to a plurality of validators in different retail facilities.

The controller 46 preferably comprises a microprocessor. However, any suitable type of controller could be provided. The input device 50 can comprise any suitable input device such as a keyboard and/or electronic reading device such as a magnetic tape reader. The input device 50 is used to input information into the memory 48. The memory 48 can include any suitable type of memory. The information input into memory 48 preferably includes product information and merchandising information. The product information preferably includes product descriptions, product sizes, prices of the products, bar code identifications, and any other type of product specific information. The merchandising information preferably includes information regarding the quantity of products in stock, information regarding manufacturers coupons, information regarding retailers' coupons and special price reductions on products, information regarding demographics of product purchases (day of week, time of day, etc.) of types of products or specific products, or any other type of merchandising information. In a supermarket, such product information would typically include information pertaining to the remaining shelf life of perishable merchandise, such as produce and other food, and to the inventories carried at the time. This kind of information is used to finetune discount and other pricing strategies. The obvious advantage of the system is the rapidity with which sales can be promoted within minutes by adjusting discounts and prices. The random selector 52 need not be provided. However, in the embodiment shown, the random selector 52 is generally adapted to randomly select discounts for specific products or groups of products within specified limits. The operation of the random selector 52 can generally be controlled and/or changed by the controller 46 and input device 50. The random selector 52 will generally use information in the memory 48 to make its random selections.

The local facility controller 40, in the embodiment shown, is substantially similar to the central location controller 38. However, it should be understood that the local facility controller 40 need not be provided or, any suitable type of local facility controller could be provided. The local facility controller 40 is connected to all of the validators 18 in the facility 10 by suitable communications cables 58. The local facility controller 40 is also connected to the central location controller 38 by means of communications cable 60. However, telephone lines or broadcast and reception means could alternatively or additionally be used to connect the controllers 38 and 40 to each other. Alternatively, the controllers 38 and 40 need not be in direct communications with each other. Suitable recording devices and mediums could be used to transmit or transfer information between the controllers 38 and 40. Communications, such as by means of telephone lines, could also be used in a periodic fashion, such as at the beginning and ending of a day.

The local facility controller 40 includes a controller 62, an input device 64, a random selector 66, and a memory 68. The controller 62 preferably comprises a computer with a microprocessor. However, any suitable type of controller could be provided. The input device 64 preferably comprises a plurality of input devices including a keyboard, a tape or floppy disk reading device, a communications port, etc. However, any suitable type of input device could be used. The random selector 66 is similar to the random selector 52 of the central location controller 38, but need not be provided. The selector 66 is generally adapted to randomly select product information for specific products or groups of products and/or randomly select discounts for specific products or groups of products within specified limits.

The operation of the random selector 66 can generally be controlled and/or changed by the controller 62 and input device 64. The random selector 66 generally uses information in the memory 68 to make its random selections. The memory 68 can comprise any suitable type of memory including a RAM, a ROM, a DRAM, and/or a PROM. Similar to the memory 48, the information input into memory 68 preferably includes product information and merchandising information. The product information preferably includes product descriptions, product sizes, prices of the products, bar code information. The merchandising information preferably includes information regarding the quantity of products in stock or on order, related inventory information, shelf life, information regarding manufacturers' coupons, information regarding retailers' coupons and special price reductions on products, information regarding demographics of product purchases (day of week, time of day, etc.) of types of products or specific products, or any other type of merchandising information. In the embodiment shown, the local facility controller 40 and validator 18 are also connected to a local facility inventory and sales system 70. The system 70 generally comprises a computer 72, a sales register 74, and input device 76. The input device 76 can include a keyboard or any suitable type of input device or devices. The input device 76 is connected to the computer 72 and is adapted to input information into a memory of the computer 72 such as product information including inventory information, expiration date information, quantity, dates of expected new deliveries of products, etc. The computer 72 can transmit this information to memory 68 in the local facility controller 40 or memory 32 in the validator 18 by any suitable means, such as communication cables 78 and 79. The sales register 74 is located at the checkout counter 16 and is also connected to the computer 72. In the embodiment shown, the sales register 74 includes a bar code reader 80. However, any suitable type of sales registers could be provided. Of course, in a preferred embodiment, the facility 10 has multiple sales registers all connected to the computer 72. The computer 72, because it is connected to both the validator 18 and the sales register 74, can credit a discount from the validator directly to a shopper's bill without having to first record the validator generated discount on a separate coupon as further understood below. Because the inventory and sales system 70 is connected to the local facility controller 40, the system 70 can inform the controller 40 of real time sales activity or sales activity information for a specified period, such as in one hour periods. This sales activity information can include quantity and product information for specific products and/or groups of products as well as redeemed discount and coupon information. Of course, the inventory and sales system 70 can convey any suitable type of information to the local facility controller 40. In addition, it should be understood that the inventory and sales system 70 could be connected or connectable directly to the central location controller 38. In addition, it should also be understood that the inventory and sales system 70 need not be provided. It should be understood that, while the random determinations described are performed in individual stores, the parameters within which such determinations vary can be predetermined at a central headquarters location of a group or chain of stores and electronically communicated to the individual stores.

It is an advantage of the present invention that customers in a store can practice the methods described, if they so desire, without wasting time or effort. All a shopper waiting in the checkout counter line has to do is to push a button or pull a lever. This single, cost-free act creates an opportunity to receive a larger than normal discount on a selected product or an even more valuable prize.

The system of the invention can be automated and centrally controlled. By being able to determine and to instantly implement product discounts, a store owner or manager can influence the volume of product sales. In effect, the system and method of the invention fundamentally transform the nature of couponing by replacing the traditional time frame, with its 24 hour advance notice to the print media, with a decision making time frame measured in minutes.

The following examples serve to illustrate the flexibility and other advantages of the system and methods. The store operator assigns the alphanumeric identification A to the beverage group. The sub-group of soda water being assigned the identification A-1 and the sub-sub group of "Club Soda" being assigned the identification A-1-1. The fresh fruit group may be identified as B, the melon sub-group as B-7, and the cantaloupe sub-sub group as B-7-3. In this manner every product carried by the stere can be identified and singled out for individual coupon value treatment. The product identifications are stored in printed tables or in a memory at a central location. The central location can be a store office, a regional office, or national office location. The same product identifications are stored in a memory in the coupon validation apparatus at a retail store. In a preferred embodiment of the invention, the control devices of validating apparatus 18 further include means for directing the printer to record an additional message on the generated coupon to the effect that an individual shopper has won an additional prize, said prize being a discount on the entire amount of said shopper's purchase. Such shoppers can be selected on the basis of percentages, such as every tenth or fiftieth shopper, or can be randomly selected within predetermined parameters.

Having identified the products to be discounted, the store or national sales manager determines the coupon or prize value to be associated with each product. In addition to determining the range of awards or discounts available for each product group or class, the operator also determines the frequency of discounts allowed within each discounted product group on a given day or during a certain week.

Thus, for example, a store manager faced by a large quantity of cantaloupes about to spoil can format his store promotion by entering the product identification B-7-3 on an entering device and further formatting the coupon frequency for group B-7-3, so as to allow a discount of 30% on all cantaloupe coupons, an additional discount of 20% on every third cantaloupe coupon and a 100% discount on every tenth cantaloupe coupon. In such an event, or for special promotions, a box holding a supply of coupons associated with cantaloupes, but carrying no specific discount, is placed near the cantaloupe section.

Applying well known principles of statistical probabilities to the random selection means, the frequencies of occurrences of pay-offs at the desired levels can be controlled and modified within desired parameters. In this manner, a store manager can salvage at least a portion of the retail value of a product rather than having to discard all of the product. When desired, the last 20 cantaloupes can be given a 100% discount. The same method may be applied to excess or other inventory, the sale of which the store manager wishes to promote. In order to promote the rapid sale of perishable or other goods, the coupon system can be adapted, upon demand by the store manager, to override the established parameters and to generate coupons carrying a larger discount on goods of selected categories. Alternatively, coupons carrying particularly steep discounts may be placed in displays/dispensers 20.

Up to the minute couponing information can be displayed on, by, or near the coupon dispensing machine. As an illustration, a manager can send electronic signal instructions to all coupon dispensing machines, which cause an electronic display to announce "All cantaloupes discounted $.50 or more". Such display can be placed near the cantaloupe section and near a coupon holder. A shopper taking a cantaloupe coupon from such a holder or tray will know that the coupon validating unit will validate such a cantaloupe coupon for at least a $.50 discount or possibly more. When desired, displays placed near individual product sections and controlled electronically from a store office, can announce to shoppers information relative to discount parameters or other values available to shoppers at a given time. The information can be changed on very short notice to implement store policy. As an example, at noon on a given day, an electronic display near the fruit section displays the message: "Until 5:00 PM today, every other strawberry coupon will carry an additional discount of 5-20%". If by 3:00 PM on that same day, the store manager determines that strawberries have not been selling satisfactorily, and particularly if there is danger of spoilage, the store office electronically re-programs the fruit display to display a modified message as follows: "Until 5:00 PM today, every strawberry coupon will carry an additional discount of 20-40%". Thus, information on the display can be changed substantially simultaneously with purchase price reduction information at the validator.

Figure 4:
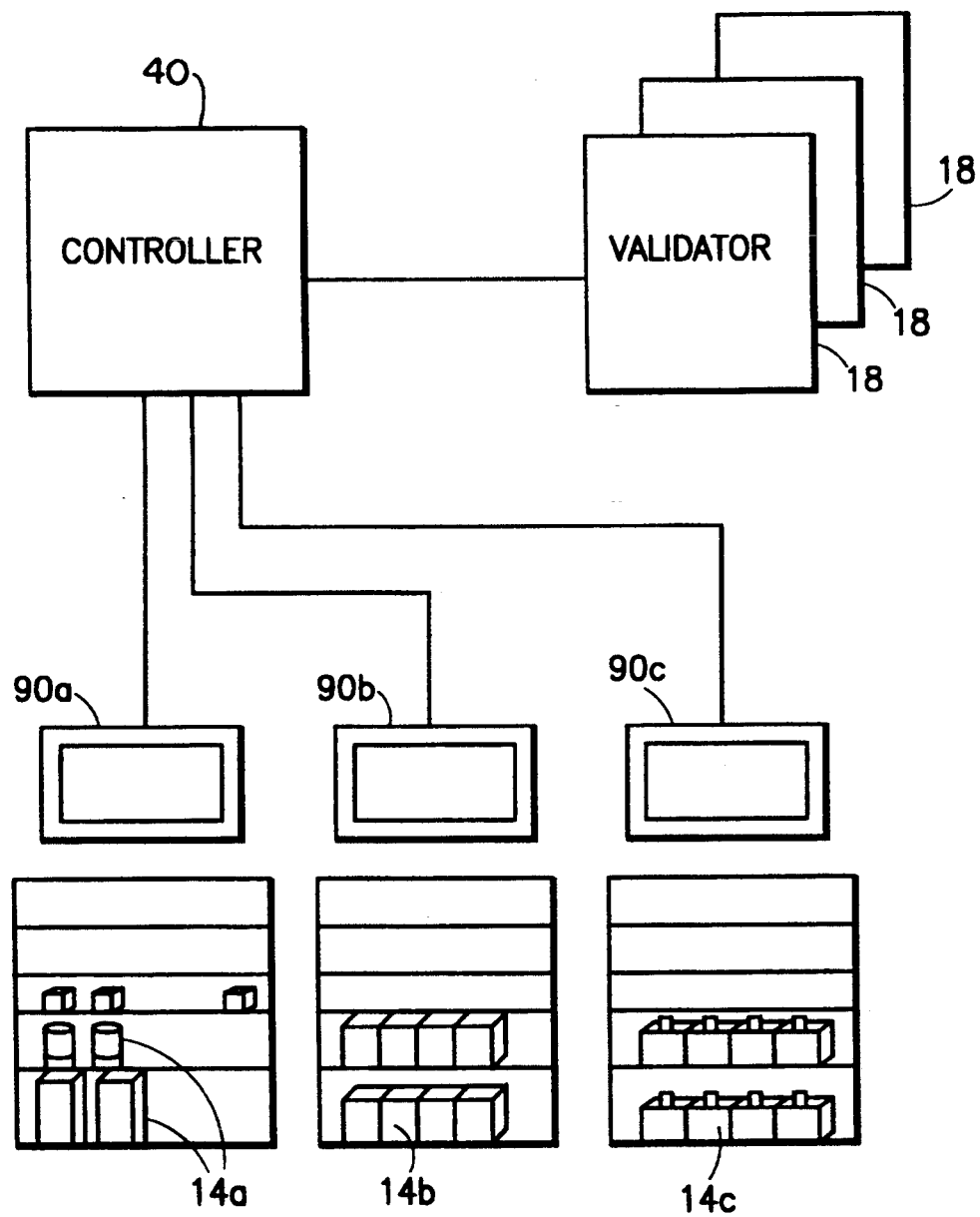
FIG. 4 is a diagrammatical view of a sales facility incorporating features of the present invention.

Referring also to FIG. 4, there is shown a diagrammatic view of a system for implementing the above described procedure. As shown, the local facility controller 40 is connected to a plurality of coupon validators or coupon value dispensers 18 and a plurality of displays 90a, 90b, 90c. Each display is located proximate a different selection of goods 14a, 14b, 14c. The controller 40 sends different signals to each display 90a, 90b, 90c corresponding to the different selection of goods proximate each display. When the controller 40 changes the value dispensed by the validators 18, it can substantially simultaneously change the information being displayed by the displays 90a, 90b, 90c to signal the change at the validators 18.

Couponing machines or validators can be programmed individually and manually, but are preferably programmed either in a wireless manner, e.g., through radio signals, or through electronic signals transmitted over wires.

Another function of the validating apparatus is the recording of the randomly determined value on a shopper's coupon. This can be accomplished by a normal thermal or other printer utilizing a paper matrix. Other types of matrices and recording methods may be employed. Following random determination and the recording of the determined value, normally expressed in terms of discount values, the shopper takes the coupon and surrenders the coupon at the checkout counter or other redemption facility. The validating apparatus can print a randomly or otherwise determined prize, such as an additional discount, on a printed coupon taken by a shopper from a print medium and brought to the retail outlet. Such a coupon, taken for instance from a free-standing insert (FSI), and carrying a product discount will attract shoppers to stores because shoppers can ascertain only in stores whether, by using the system and method of the invention, they have won an additional award determined and recorded on said FSI coupon in their retail outlet.

The value of the coupon, such as the discount, can then be deducted from the price of the merchandise to which the discount is applicable. After paying the net purchase price, the shopper takes possession of the merchandise. The validator 18 can be programmed so as to print on a shopper's coupon a message to the effect that, in addition to the discount, the shopper has won a special award, such as a cash prize or an additional discount on the same or another product identified by printing on the coupon inserted into validator 18.

The invention adds the thrill of a cost-free gamble to consumers' shopping trips without slowing down movement of lined-up shoppers towards the checkout counter. Other persons standing in line can observe, such as on one or more displays, the results of each random selection, including occasional sweepstake prizes.

The operation and use of the system described above will now be described. While the following steps are being described in a specific sequencer it should be understood that some of the steps may be performed in different sequences without departing from the object of the invention. It also should be understood that not all of the steps enumerated have to take place inside the facility 10 and, the steps of receiving value, such as discounts or other credits, can be chronologically separated and can take place on a subsequent date, shopping trip, or at a separate facility.

Following the categorization of products by a store operator, products 14 are displayed to shoppers at display 12. A shopper selects from the product categories and takes a product. The shopper can take a coupon or other token from a coupon holder or dispenser 20. Alternatively, if desired by a shopper and upon demand, such as by touching a key or button, validator 18 can dispense an unvalidated coupon to a shopper and such a coupon can thereupon be validated so as to carry a value award.

Upon the shopper having collected all of the products intended to be purchased, the next stop of a shopper is at the random coupon generator or validator 18 located just ahead of the checkout counter 16. The validator 18 is generally provided such that coupons carrying a specific discount or, even no discount, may be upgraded by said validator 18 so as to carry a larger discount or prize than that initially carried by the coupon. The validator 18 increases or adds to the discount shown on the original coupon based upon predetermined percentages, such as the percentage of coupons used with the validator 18, prior values of added discount value that has been added to coupons by the validator, and control percentages transmitted to the validator 18 by the local facility control 40 and/or central location control 38. The validator also preferably varies the value of added discount values to each coupon used with the validator. The validator 18 also preferably generates and stores a cumulative record, such as a composite copy in tape form, of dispensed discount values to the central location control 38 and/or the local facility control 40. In this fashion, the coupon system can keep a running cumulative record of relevant merchandising information, including couponing, sales, remaining inventory, date and time of sale, remaining shelf life, cumulative discounts or deductions from the original retail prices, and net sales proceeds.

As an example, every coupon dispensed or taken by a shopper originally carries a $.50-off discount. The random coupon validator 18 can, upon use, indicate on the coupon that the original $.50 discount remains unchanged (by printing nothing) or, that the discount has been raised to $.75 and in some instances to $1.00. In some cases, a validated coupon could entitle a shopper to a 100% discount, i.e., a free product. Coupons initially taken by shoppers from the display/dispenser 20 may carry a zero discount, in which case the value of the coupon would depend on the random selection by the validator to place a value upon the coupon. As noted above, the added discount values dispensed by the validator 18 are randomly generated within a specific range or limits. However, these limits can be altered based upon the initial purchase price of the product. For example, for cantaloupes, the coupon pay-off parameters could be limited to between $.25 and $1.00. In the case of a bottle of wine, the coupon pay-off parameters could be limited to between $1.00 and $3.00. As used herein, the term "parameters" is intended to include ranges, limits, delineations, and band widths of variables, such as discounts and prizes.

A shopper, having received a validated or upgraded coupon, then proceeds to the checkout counter 16, presents the merchandise, surrenders the original or upgraded coupon, is billed for his purchase, and receives value consideration, such as a discount credit. The personnel at checkout counter 16, after deducting the shopper's discount, collects from the shopper the net price of the merchandise, which is paid by the shopper before taking final possession of the products.

As noted above, the validator 18 preferably has a display 24. The display 24 is provided in order to visually display, other than on the coupon, the result of each random determination. Nearby shoppers will be interested in following events and in observing the success of fellow shoppers, similar to the interest shown by TV-viewers in the success of studio contestants. Large payoffs by the validator 18 can be accompanied by flashing lights and appropriate sounds by signalor 82, such as a bell or the clattering sounds heard in gambling casinos.

As noted above, the validator 18 can be designed so as to be electronically coupled to a cash register at a checkout counter. Thus, in one type of system having the validator parallel to or at the checkout counter 16, when a checkout clerk rings-up or scans a product to which an added discount value would apply if the validator 18 were used with a corresponding coupon, the inventory and sales system 70 can automatically activate the validator if the appropriate coupon is inserted into the validator within a given time limit, such as before the shopper is finished at the checkout counter. The coupons may be coded, such as by a bar code, which can be recognized by a scanner at the coupon receiving slot 28 in the validator 18. Upon the scanner recognizing the appropriate coupon, the random selector or value determination means 36 can then apply the predetermined pay-off or added discount value to the coupon by means of the printer 34. The random determination means can be programmed electronically from the store office so as to modify and shift frequency and range of discount validations within the desired limits. In an alternate embodiment, by ringing up the price of a product which is eligible for discount couponing, the clerk at the checkout counter could automatically activate the validator and, receive the appropriate coupon directly from the validator. In that case, a display visible to the shopper would enable each shopper to observe the discount determination process. In a modified version of this system, the display 24 could replace the step of dispensing a coupon.

In most instances, however, the purpose of adding interest and excitement to the act of shopping can be achieved in a more vivid manner by permitting each shopper personally to activate the random coupon validator, such as by pulling a lever, and to directly receive the discount or prize coupon. The validating apparatus 18, or another apparatus in the retail facility, can be designed so as to display not only the discount or prize won by a shopper, but also to display the name of the discounted product and the period of time during which the product will continue to be discounted for other shoppers in line at the checkout counter to see. A modified version of the retail facility comprises means for audibly acquainting shoppers in the retail outlet with such product and discount information.

One method of the present invention employs the use of tokens or coupon blanks, such as coupons that indicate a specific product or products in connection with which the blank could be used, but does not indicate a specific added discount value. With the use of these types of tokens or coupons blanks, the validator 18 can be programmed or set up to dispense specific fixed discount values to be indicated on coupon blanks used with the validator for the product specified on the coupon blank. The use of tokens or of coupon blanks can greatly reduce unnecessary or excess costs relating to fully preprinted coupons that may never be used. With coupon blanks, if the blanks are not used during a specified period of time, they can be stored until a new sale of the product occurs in the future. A further advantage of coupon blanks is that, because the validator 18 can be rapidly reprogrammed, such as at the local facility control 40, a store manager or other employee can change added discount values on very short notice.

For example, an announcement over a store's public address system may inform shoppers that for the next hour a large percentage of $1.00 discounts will apply to sixpacks of a certain brand of beer accompanied by a validated coupon. The coupon validator 18 itself can be the dispenser of unvalidated or blank coupons associated with an identified product, in which event a shopper activates the validating unit 18 which, upon random selection of value consideration within a pay-off range, prints and dispenses a validated coupon to the shopper in accordance with pay-off instructions. According to another embodiment of the system, coupon blanks do not indicate a discount value, nor do they specify a product. Upon insertion by a shopper, validator 18 provides a printed message on a coupon that the coupon carries a discount on a product available for sale along the checkout counter path, such as publications, candy or other products.

When desired, the coupon validating apparatus 18 can be placed at a store location so that shoppers receive their validated coupons after they have paid for and taken possession of their purchases. This method is used when the validated and dispensed coupons are to be utilized to attract shoppers to the same store on repeat visits for additional purchases such coupons can carry advertising and promotional messages.

The methods and systems described have the advantage that bar-coded products which are to be discounted need not be modified, i.e., nothing need appear on the package of the product which identifies the product to a shopper as being subject to a specific discount. A shopper simply takes a wanted product to a checkout counter. In this manner, large pay-offs, such as discounts unexpected by shoppers, can be interspersed advantageously from time to time to add interest and excitement to the shopping process and without having to show any discount on the product itself.

The term "pay-off" as used herein is intended to include the amount, value, award or prize associated with or carried by a coupon, certificate, token, printout or simply by an electronic display. In a more comprehensive sense, the term "pay-off" includes the frequency with which coupons are awarded and the discount bracket or parameters within which such discounts are randomly determined.

The printing means 34 of the validating apparatus 18 can be provided with the capability of printing advertising or promotional messages on the coupons. The printing means 34 can also be programmable by electronic signals from a central location.

The eligibility of a product for discounts can be controlled quickly and easily from a central store location or even from a central multi-store headquarters by identifying bar-coded products through recognition means or scanner of the validation apparatus 18. According to a modified version of the system, a central random determining device in a store office can perform the random determining step, in which event the results of the random determinations are electronically communicated to the individual validating apparatuses, which are governed thereby. The individual validating apparatuses, however, can have rotating drums or other well-known means activated by a shopper and performing no real function, but simulating or giving the appearance of performing the random selection process, such as is expected by customers, for example in casinos. This type of modified system reduces overall costs.

The system permits blank or general purpose matrices to be used as coupons for a number of different products, the products being identified through bar-codes for discount eligibility. The validating apparatus 18 can be provided with means for separating or cutting any suitable matrices into validated coupons or even gift certificates.

The coupon validating units can be programmed so as to indicate on a coupon that a shopper, in addition to the discount on a purchased product, is entitled to an additional free product.

It is to be understood that the above described embodiments of the invention are illustrative only, and that modifications thereof may occur to those skilled in the art. Accordingly, this invention is not to be regarded as limited to the embodiments, disclosed herein, but is to be limited only as defined by the appended claims.

What is claimed is:

1. A method for selling products at a retail outlet comprising steps of:

displaying products available for sale at said retail outlet;

providing at said retail outlet a checkout including a billing system;

providing at said retail outlet a couponing system having means for identifying a product to which a coupon corresponds, means for randomly determining coupon pay-offs within predetermined parameters, said predetermined parameters corresponding to the type of product to which the coupon corresponds, and means for adding value to the coupon by recording thereon a pay-off value;

formatting the parameters of coupon pay-offs within which coupon pay-off values are determined by said couponing system, the step of formatting including identifying products, determining pay-off values to be associated with said products, and determining frequencies of discounts;

entering said formatted parameters in said means for randomly determining pay-off value;

activating said couponing system by a shopper;

recording one of said randomly determined pay-off values on a shopper's coupon;

presenting said coupon and a product corresponding to a product identified on said shopper's coupon by the shopper at said checkout; and deducting said randomly determined pay-off value recorded on said presented shopper's coupon from the shopper's bill.

2. The method of claim 1, wherein the step of formatting said parameters comprises manually entering said parameters into said determining means.

3. The method of claim 1, wherein the step of formatting said parameters comprises entering said parameters in said determining means by means of wireless electronic transmissions.

4. The method of claim 1, wherein the step of formatting said parameters comprises entering said parameters into said determining means by means of electronic signals transmitted over wires.

5. A method for selling products comprising steps of:

displaying, at a retail outlet, a plurality of products available for sale to shoppers;

categorizing said products by an operator of said retail outlet;

selecting a categorized product by a shopper;

receiving a coupon associated with said selected categorized product by the shopper;

formatting, by an operator, predetermined coupon pay-off parameters for individual ones of said product categories, the step of formatting including identifying products, determining pay-off values to be associated with said products, and determining frequencies of discounts;

providing, at said retail outlet, a checkout including a billing system;

providing, at said retail outlet, a couponing system having means for identifying a product to which a shopper's coupon corresponds, means for randomly determining coupon pay-offs within said predetermined parameters for said product, and means for adding value to the shopper's coupon by recording a pay-off value on the shopper's coupon;

entering, by an operator, said parameters of said coupon payoffs carried by a coupon associated with a product category into said couponing system;

activating said coupon system;

randomly determining the pay-off value of a shopper's coupon value within said parameters;

recording said randomly determined pay-off value on the shopper's coupon; and a shopper receiving the benefit of said coupon pay-off value at said checkout.

6. The method of claim 5, wherein the step of formatting parameters comprises formatting a value range and a frequency of adding value to shoppers' coupons associated with a product category.

7. The methods of claims 1 or 5, wherein all coupons that have a pay-off value recorded thereon carry a minimum discount.

8. The methods of claims 1 or 5, wherein all coupons that have a pay-off value recorded thereon carry a minimum discount associated with a product category.

9. The methods of claims 1 or 5 wherein a coupon that has a pay-off value recorded thereon entitles a shopper to receive value consideration subsequent to and independently of a product sale and purchase.

10. The methods of claims 1 or 5, wherein said step of activating said couponing system occurs prior to a shopper presenting a product at said checkout.

11. The methods of claims 1 or 5 wherein said step of activating said couponing system occurs essentially concurrently with a shopper presenting a product at said checkout.

12. The method of claim 5 wherein said coupon is dispensed to a shopper by a dispenser at said retail outlet.

13. A method for selling products at a retail outlet comprising steps of:

displaying products available for sale at said retail outlet;

selecting a product by a shopper;

making coupons available to shoppers;

providing at said retail outlet a coupon value adding apparatus, said apparatus including:

means for electronically receiving and storing instructions for adding value to a shopper's coupon within predetermined parameters, means for identifying the product to which the coupon corresponds, means for randomly determining the value to be added to a coupon within said parameters for said product identified by said means for identifying, means for recording said randomly determined value on said coupon, adding value to a shopper's coupon at said apparatus by said shopper;

said shopper presenting a selected product for billing at a checkout of the retail outlet;

said shopper surrendering said coupon having added value at said checkout; and making available to said shopper at said checkout said randomly determined added value by reducing the purchase price for the selected product at the checkout corresponding to the recorded added value on said coupon.

14. The method of claims 1, 5 or 13, including, when rapid sales of a category of products are to be promoted, dispensing to shoppers coupons carrying particularly steep discounts on said product category.

15. The method of claim 13, wherein said apparatus is programmed so as to record on a shopper's coupon a message informing the shopper of an additional award.

16. The method of claim 13, wherein said apparatus is adapted, upon demand, to dispense coupons indicating no value.

17. The method of claim 13, including the step of randomly awarding individual shoppers an additional prize recorded by the apparatus on such shoppers' coupons, entitling said shoppers to a discount on their entire purchase.

18. A retailing facility comprising:

a display for products available for sale to shoppers;

means for making coupons available to shoppers;

a checkout with billing means; and a coupon value adder system integrated into said retailing facility, said system comprising:

means for randomly determining coupon pay-off values for shoppers' coupons within predetermined parameters, said means for randomly determining including means for identifying the type of product to which a shopper's coupon corresponds;

means for formatting operating parameters of said determining means within which to randomly determine the pay-off values;

means, operable by a shopper, for activating said determining means;

means for reformatting the operating parameters of said determining means; and means for recording a determined one of the pay-off values on a shopper's coupon;

wherein said billing means include means for crediting a shopper's account with an original value and the pay-off value of said shopper's coupon.

19. The retailing facility of claim 18, wherein successively recorded coupon pay-off values have different values.

20. The retailing facility of claim 19 wherein said successively recorded coupon pay-off values include different values and frequencies of determination for said different pay-off values.

21. The retailing facility of claim 18, wherein, following said recording, successive coupons having pay-off values recorded thereon vary with respect to absolute values, value range and frequency of occurrence within said value range.

22. The retailing facility of claim 18 having means for announcing prizes awarded to a shopper to other shoppers in the retail facility.

23. The retailing facility of claim 22 wherein said means for announcing are located at a checkout line.

24. A coupon value adder system integrated into a retail facility with a checkout and a billing means, said system being characterized by:

categorized products made available for purchase by shoppers;

coupons made available to shoppers of said products;

means for identifying a product to which a shopper's coupon corresponds;

means for randomly determining coupon pay-off values and frequencies to be added to shoppers' coupons within predetermined parameters, said predetermined parameters including the type of product to which the shopper's coupon corresponds, said means for randomly determining being adapted to perform said determining for individual shoppers; and means for recording a randomly determined coupon pay-off value on a shopper's coupon;

wherein a shopper can present said shopper's coupon with one of the recorded coupon pay-off values thereon and a corresponding one of said categorized products at said checkout and said billing means can reduce the shopper's bill by the value of said shopper's coupon.

25. The system of claims 18 or 24, wherein said means for randomly determining coupon pay-off values includes control means operable by a store operator for limiting the randomly determined values and percentages of coupons within predetermined ranges.

26. The systems of claims 18 or 24, wherein said coupons carry discount credits ranging up to 100% of the product price.

27. The systems of claims 18 or 24, wherein coupons, made available to shoppers prior to said determining step, carry different minimum rates of discounts.

28. The systems of claims 18 or 24, wherein a percentage of said coupons entitle a shopper to a cash or sweepstake prize.

29. The systems of claims 18 or 24, wherein said determining means are controlled by means operable by a store operator for formatting and reformatting said coupon value parameters.

30. The systems of claims 18 or 24, wherein said determining means are controlled by reformatting coupon values, value ranges and value frequencies associated with product categories.

31. The system of claims 18 or 24, wherein identifications of categorized products are stored in a memory of said determining means.

32. The systems of claims 18 or 24, wherein said pay-off value takes the form of a merchandise item.

33. The systems of claims 18 or 24, including display means near coupon dispensing means announcing minimum discounts associated with a specific product.

34. The systems of claims 18 or 24, wherein the value adder system is adapted to generate, for use by managers of said retail facility, a cumulative record of merchandising information obtained in the course of operation, selected from the group including couponing, sales, inventory, date and time of sales, shelf life of remaining inventory, discounts and net sales proceeds.

35. The system of claim 24 having means, operable at said checkout, for activating said value adder system.

36. The system of claim 18 or 24, further including means in said retail facility for acquainting shoppers with product and discount information.

37. The systems of claims 18 or 24 wherein said parameters are predetermined at a central headquarters location and electronically communicated to at least one individual retail outlet.

38. The systems of claims 18 or 24, wherein said random determining means are located at a central location and wherein said random determinations are electronically communicated to at least one individual validating apparatus at retail outlets.

39. The systems of claim 38, wherein the validating apparatuses have means for simulating a random pay-off selection process.

40. A retail facility comprising:
means for presenting a variety of products to shoppers,
means for dispensing to shoppers product-specific tokens which do not indicate a product discount,
a discount system integrated into said retail facility for adding value to the tokens by recording thereon a product discount to thereby generate a product discount coupon, said system comprising:
means for identifying a product to which a token corresponds,
means for randomly determining product discounts within predetermined parameters, said predetermined parameters corresponding to the type of product to which the token corresponds,
means for formatting said parameters,
means, operable by a shopper, for activating said determining means,
means for reformatting product discounts,
means for recording said randomly determined discount on a shopper's token to thereby form the discount coupon, and
a checkout with means for billing a shopper for purchased products and for allowing credit for values on coupons.

41. A method for attracting shoppers to retail outlets comprising the steps of:
offering a variety of products for sale to shoppers in a retail outlet,
making coupons available to shoppers at the retail outlet, said coupons being numbered or coded and carrying a discount randomly determined in the retail outlet by a coupon generating system,
a shopper bringing a preprinted coupon to said retail outlet, said printed coupon being coded,
a shopper purchasing a product in said retail outlet,
a shopper presenting the generated coupon and the preprinted coupon at a checkout of the retail outlet, and
awarding an additional prize to a shopper whose generated coupon and preprinted coupon bear codes having a predetermined relationship.

42. A method for attracting shoppers to retail outlets, comprising the steps of: offering a variety of products for sale to shoppers in a retail outlet,
a shopper bringing a preprinted coupon to said retail outlet, said preprinted coupon carrying a discount on a specific product,
providing at said retail outlet a coupon value adder apparatus for recording on the shopper's preprinted coupon an additional value based upon a product identified on said preprinted coupon, said apparatus having been configured by a retail outlet operator,
adding value to the preprinted coupon at the apparatus by recording on said preprinted discount coupon the additional value,
the shopper presenting both the product identified on said preprinted coupon and the discount coupon having the additional value recorded thereon at a checkout,
the shopper, when paying for purchased merchandise, receiving the benefit of an original discount on the preprinted coupon and the additional value recorded on said preprinted coupon by the value adder apparatus, and
the retail outlet operator reconfiguring the apparatus at the retail outlet based upon sales at the retail outlet for a given time period.

43. A method for selling products at a retail outlet comprising steps of:
providing at said retail outlet a coupon discount value generator having means for identifying a discount coupon, means for randomly determining added coupon discounts and means for recording said determined added coupon discounts on shoppers' coupons, said means for randomly determining added coupon discounts determining the discounts based solely upon:

a product or group of products to which the coupon corresponds, a configured range of available added coupon discounts for the product or group of products, and a configured frequency of said added coupon discounts for the product or group of products;

configuring the parameters of the added discounts within which coupon discounts are randomly determined by said coupon value generator;

entering said configured parameters in said means for randomly determining added discounts;

a shopper inserting on said coupon value generator a discount coupon identifying a specific product;

activating said coupon value generator by a shopper; and recording one of said randomly determined added coupon discounts for the specific product identified on said inserted discount coupon.

* * * * *